US008258659B2

(12) United States Patent
Debrailly et al.

(10) Patent No.: US 8,258,659 B2
(45) Date of Patent: Sep. 4, 2012

(54) SHAFT SUPPORT SYSTEM FOR ELECTRIC MOTOR, ELECTRIC MOTOR AND METHOD FOR MAKING SAME

(75) Inventors: Franck Debrailly, Nouzilly (FR); Domenico Restaino, Palaiseau (FR); Olivier Message, Tours (FR); Franck Landrieve, Fondettes (FR)

(73) Assignee: Aktiebolaget SKF, Göteborg (SE)

( * ) Notice: Subject to any disclaimer, the term of this patent is extended or adjusted under 35 U.S.C. 154(b) by 342 days.

(21) Appl. No.: 12/225,076

(22) PCT Filed: Mar. 14, 2007

(86) PCT No.: PCT/FR2007/050922
§ 371 (c)(1),
(2), (4) Date: Mar. 16, 2009

(87) PCT Pub. No.: WO2007/104894
PCT Pub. Date: Sep. 20, 2007

(65) Prior Publication Data
US 2009/0261693 A1 Oct. 22, 2009

(30) Foreign Application Priority Data

Mar. 15, 2006 (FR) ..................... 06 02256

(51) Int. Cl.
*H02K 23/66* (2006.01)
*F16C 19/32* (2006.01)
*H02K 11/00* (2006.01)
*F16C 13/04* (2006.01)

(52) U.S. Cl. ............. 310/68 B; 310/85; 310/89; 310/90; 310/91; 384/418; 384/448

(58) Field of Classification Search ................ 310/68 B, 310/68 R, 85, 89, 90, 91; 384/91, 114, 418, 384/448, 548; *H02K 23/66, 11/00; F16C 19/00, F16C 19/02, 19/04, 19/32, 13/00, 13/02, F16C 13/04*
See application file for complete search history.

(56) References Cited

U.S. PATENT DOCUMENTS

| 4,615,626 | A | 10/1986 | Iwaki | |
|---|---|---|---|---|
| 6,043,643 | A * | 3/2000 | Message et al. | 384/448 |
| 6,595,693 | B1 * | 7/2003 | Message et al. | 384/448 |
| 6,821,021 | B2 * | 11/2004 | Message et al. | 384/448 |
| 2002/0130570 | A1 * | 9/2002 | Howe et al. | 310/89 |
| 2002/0181815 | A1 * | 12/2002 | Beauprez | 384/448 |

FOREIGN PATENT DOCUMENTS

| FR | 2804479 A1 | 8/2001 |
|---|---|---|
| JP | 08023666 A | 1/1996 |
| JP | 08331810 A | 12/1996 |

* cited by examiner

*Primary Examiner* — Quyen Leung
*Assistant Examiner* — Michael Andrews
(74) *Attorney, Agent, or Firm* — Mark A. Ussai; Bryan Peckjian

(57) ABSTRACT

A shaft support system 7 for an electric motor 1, comprising a rolling bearing 17 provided with an inner race 33 and an outer race 34, at least one angular position sensor 20 for detecting the angular position of the inner race, an encoder 19 mounted on the inner race, a flange 16 for supporting the outer race of the bearing, and a processing module 18 supported by the flange.

11 Claims, 5 Drawing Sheets

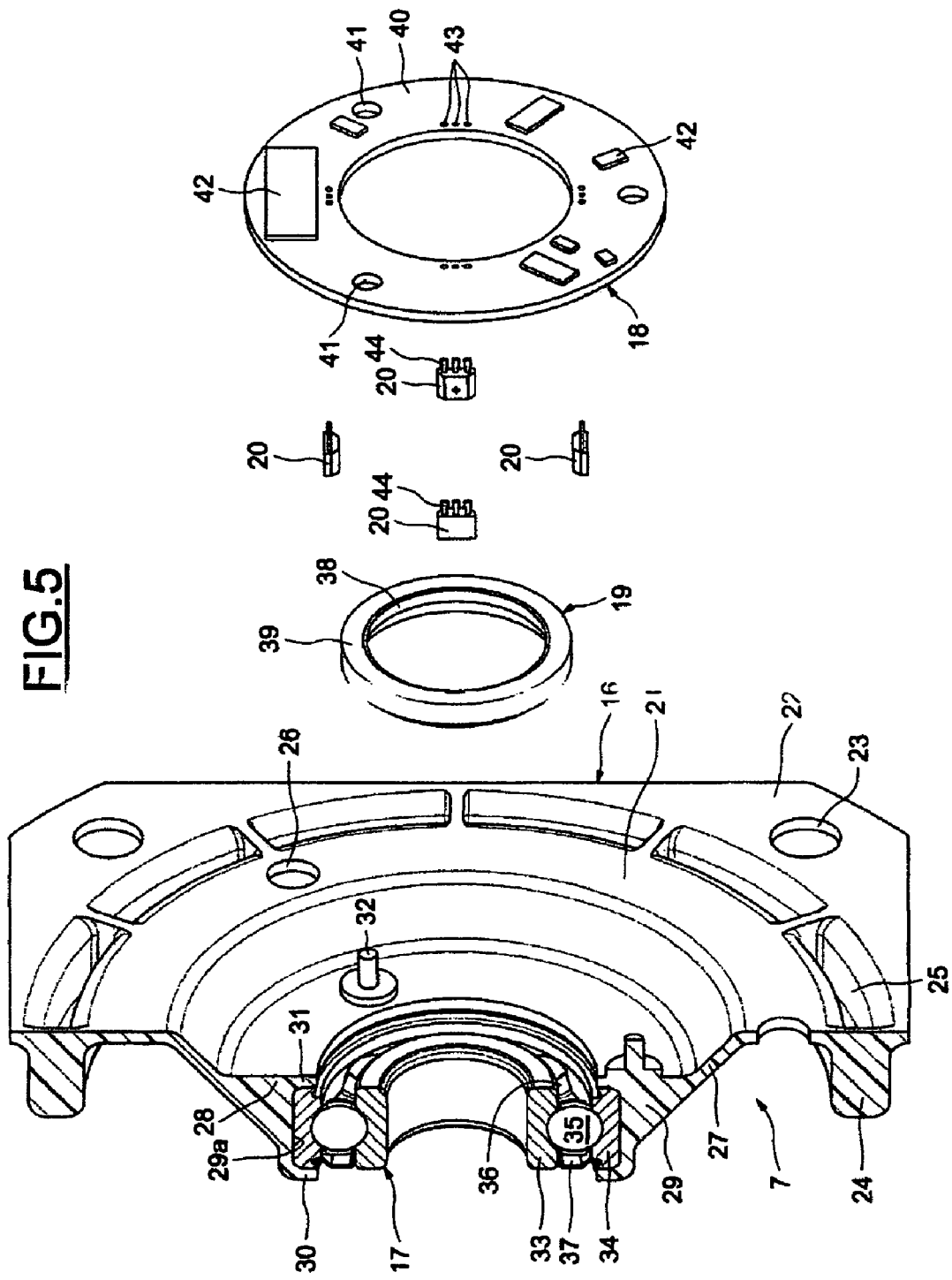

SHAFT SUPPORT SYSTEM FOR ELECTRIC MOTOR, ELECTRIC MOTOR AND METHOD FOR MAKING SAME

The present invention relates to the field of electric motors and more particularly that of the supports making it possible to provide the mechanical connection between a rotating shaft and an electric motor casing.

The abstract of document JP-A-08023666 describes a brushless motor comprising an attachment part associated with a Hall effect sensor provided to detect magnets mounted on the shaft. The shaft is mounted rotatably in the attachment part by means of bearings.

In a conventional motor of this type, the steps for assembling the motor are relatively numerous and complicated because of the large number of separate parts which perform the mechanical and electrical functions and the functions of detecting the angle of rotation of the rotor.

The object of the present invention is to remedy the disadvantages of the prior art mentioned above.

The present invention proposes a multifunctional shaft support.

The present invention proposes a rolling bearing and flange subassembly providing the mechanical connection between the shaft and the casing of the motor, and serving as a support for the sensor and the signal processing electronics.

The shaft support system for an electric motor comprises a rolling bearing provided with an inner race designed to be mounted on the shaft, and an outer race, at least one angular position sensor for detecting the angular position of the inner race, an encoder mounted on the inner race, a flange for supporting the outer race of the bearing, and a processing module supported by the flange. The support constitutes a subassembly performing the functions of bearing, flange and angular detection.

In one embodiment, the sensor is mounted on the processing module connected to an output of the sensor.

In one embodiment, the processing module is configured to receive an output signal from the sensor(s) representative of the angular position of the encoder relative to the sensor and to transmit as an output an item of processed information representative of the angular position of the encoder relative to the sensor. The support also performs the function of processing the angular detection information.

In one embodiment, the flange is sealed.

In one embodiment, the flange comprises means of attachment to an electric motor. The attachment means may comprise through-holes making it possible to screw the flange onto the sensor of the electric motor.

In one embodiment, the system comprises a means for sealing with an end of the inner race. The flange thus forms the axial end of a motor and prevents an ingress of liquid or pollutants. The seal may be of the narrow passage or friction lip type with the encoder or the inner race or the shaft of the motor.

In one embodiment, the angular position sensor is capable of detecting an absolute angular position. It is therefore possible to ascertain with precision the angular position of the shoulder of the rotor relative to the stator, which is particularly useful in the case of a brushless direct current motor.

In one embodiment, the processing module comprises an electronic circuit board supporting the sensors.

In one embodiment, the processing module is configured to transmit an item of output information in analog or digital form.

In one embodiment, the flange is overmolded onto the outer race.

In one embodiment, the outer race comprises a surface in contact with the flange furnished with coupling reliefs. Said surface may be the outer surface of the outer race. The coupling reliefs may be obtained by knurling.

In one embodiment, the processing module is configured to transmit an item of output information in the form of pulse width modulation.

The invention also relates to an electric motor comprising a shaft, a rotor, a stator and a system as above supporting the shaft, mounted in the stator and capable of providing as an output the angular position of the rotor relative to the stator.

In one embodiment, said system closes an axial end of the motor. This gives an excellent seal.

The method for manufacturing a shaft support system for an electric motor comprises the steps of attaching a flange to an outer race of a rolling bearing fitted with an encoder, mounting a processing module fitted with an angular sensor on the flange, when the sensor and the processing module have been connected.

In one embodiment, the flange and the rolling bearing are attached to one another so that they cannot be taken apart.

In one embodiment, the flange is overmolded onto the outer race. This gives an excellent seal.

The motor may be assembled by orienting the rotor, bringing the shaft support system via an axial movement, the rotor shaft entering the rolling bearing and by attaching the flange to the casing of the electric motor. The attachment can be achieved by screwing.

In this way it is possible to provide an electric motor manufacturer with a multifunctional subassembly providing the mechanical connection between the shaft and the casing, supporting the electronic circuit for processing the signal and supporting the rotary sensor(s). The encoder is advantageously supported by a bearing race. The support system is axially compact, is capable of sealing the motor by the mounting of a single subassembly, provides local processing of the output signals from the sensor(s) immediately next to the sensor(s), hence better signal quality. Specifically, the processed output information is less sensitive to interference or outside influences than the output signals from the sensor(s), particularly when the processed output information is in digital or pulse width modulation form.

The present invention will be better understood on reading the detailed description of an embodiment taken as an example that is in no way limiting and is illustrated by the appended drawings, in which:

FIG. 5 is an exploded view in perspective of the shaft support; and

Figure 1:
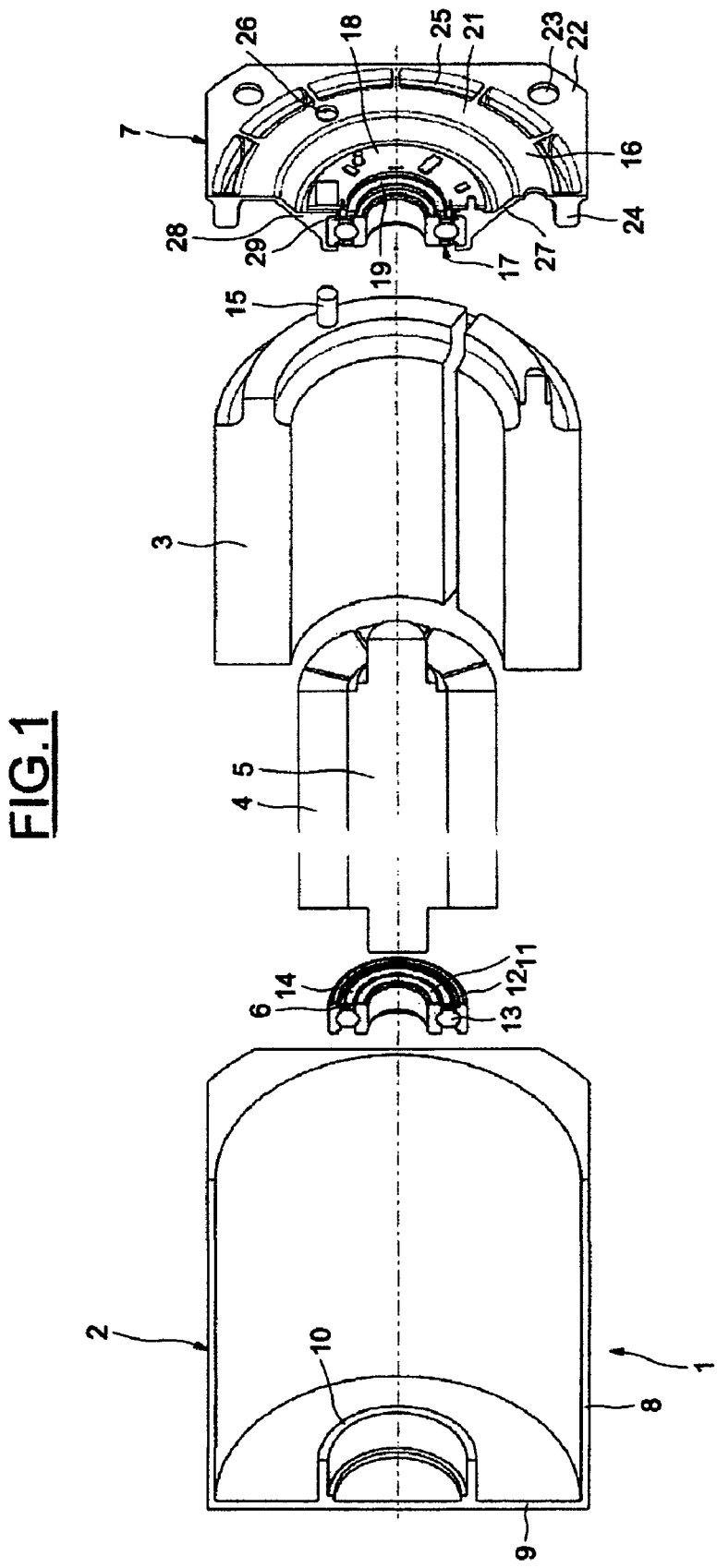
FIG. 1 is an exploded view in section of an electric motor.
Figure 2:
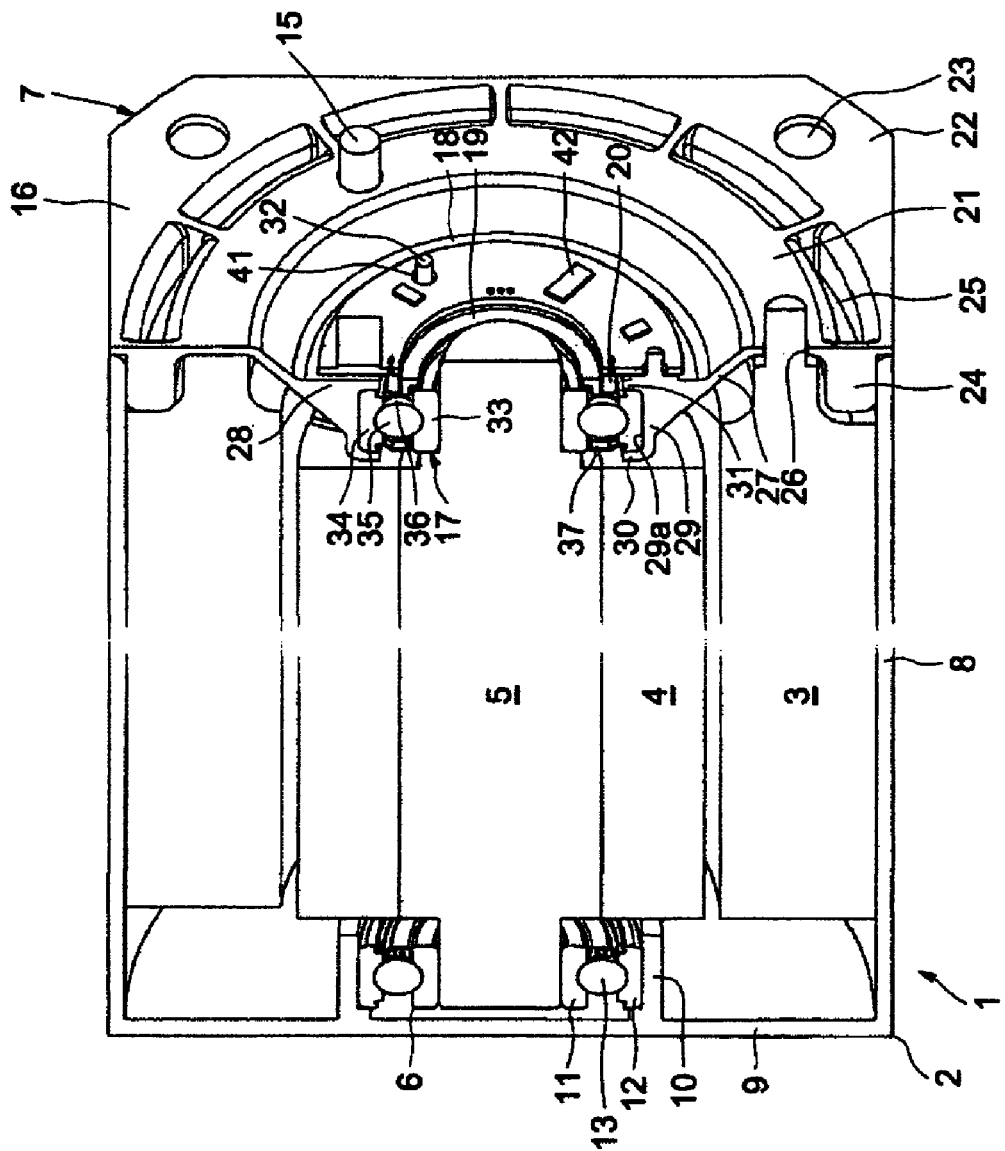
FIG. 2 is a view in section of the electric motor.

As illustrated in FIGS. 1 and 2, the electric motor referenced 1 in its entirety, comprises a casing 2, a stator 3 mounted in the casing 2, a rotor 4 and a shaft 5 fixedly attached in rotation to one another, a rolling bearing 6 placed between one of the ends of the shaft 5 and the casing 2, and a shaft support system 7 attached to the casing 2 and supporting the other end of the shaft 5. More particularly, the casing 2 comprises an axial portion 8, a radial bottom 9 closing one of the ends of the axial portion 8, and an axial collar 10 attached to the radial bottom 9, centered on the axis of the motor and designed to receive the rolling bearing 6.

The rolling bearing 6 may be of the conventional type with an inner race 11, an outer race 12, an array of rolling elements 13, in this case balls, placed between an outer raceway of the inner race 11 and an inner raceway of the outer race 12. The rolling bearing 6 may be provided with a cage for maintaining the circumferential spacing of the rolling elements 13 and a seal 14 placed on the side opposite to the radial bottom 9. The presence of a seal on the side of the radial bottom 9 is not essential, because the closed radial bottom 9 effectively protects the rolling bearing 6 against the intrusion of outside pollutants. One of the ends of the shaft 5 is sleeve-fitted into the inner race 11.

The stator 3 is in the form of a tubular part, coming close to the radial bottom 9 of the casing 2 and in contact with the bore of the axial portion 8. The stator 3 also comprises three axial pins 15 protruding in the direction opposite to the radial bottom 9. The rotor 4 is attached to the shaft 5 and is mounted inside the stator 3 while being able to rotate relative to said stator 3.

Figure 4:
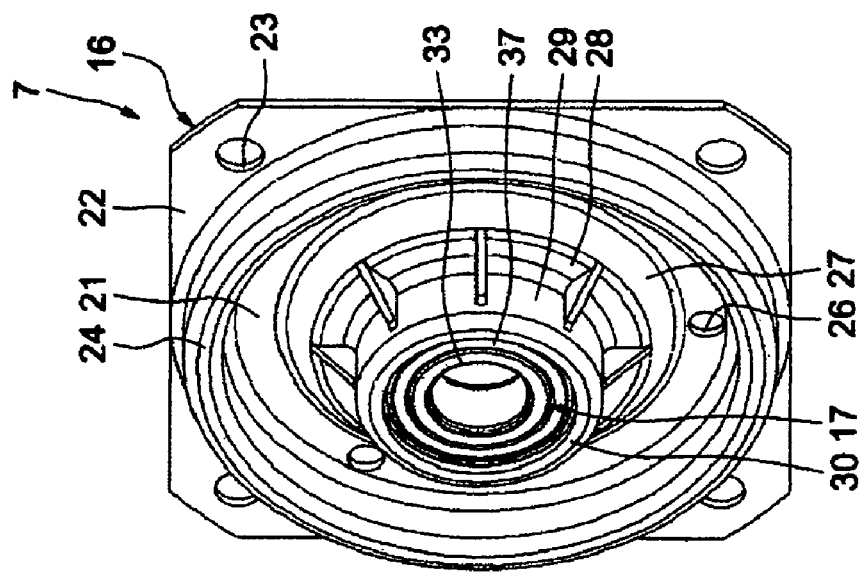
FIG. 4 is a view in perspective opposite to FIG. 3 of the shaft support.
Figure 3:
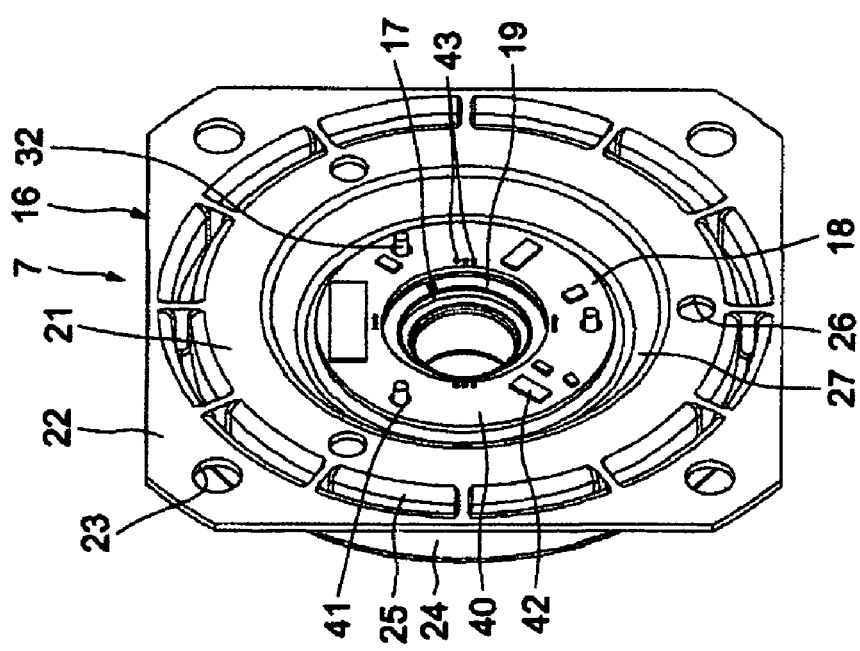
FIG. 3 is a view in perspective of the shaft support.

The support system 7 for the shaft 5, which can be seen in greater detail in FIGS. 3 to 5, comprises a flange 16, a rolling bearing 17 supported by the flange 16, an electronic processing module 18 also supported by the flange 16, an encoder 19 supported by the rolling bearing 17 and at least one sensor 20 supported by the module 18. In the embodiment shown, four sensors 20 are provided. In the mounted state, the support system 7 closes the end of the casing 2 on the side opposite to the radial bottom 9.

The flange 16 comprises a wall 21 of generally annular radial shape extending toward the outside through four tabs 22 that are also radial. Each tab 22 is provided with a through-hole 23 allowing a stud or a screw to pass through in order to attach the support system 7 to the casing 2. The flange 16 is provided with an annular rib 24 extending axially in the direction of the radial bottom 9 and in contact with the bore of the axial portion 8 of the casing 2, thereby centering the flange 7 in the casing 2. A plurality of recesses 25, in the shape of an arc of a circle, are arranged on the outer face of the flange 16 radially at the rib 24 for reasons of withdrawal on removal from the mold and of differential cooling, thereby preventing a thick portion from cooling more slowly than the thinner portions.

A plurality of through-holes 26, in this instance three in number, is arranged in the annular radial portion 21 and is provided to receive the fingers 15 of the stator 3. The stator 3 is therefore immobilized in rotation relative to the support system 7. The fingers 15 and the holes 26 may be evenly distributed circumferentially or on the contrary distributed at an angle different from 120° in order to achieve an indexation of the stator 3 relative to the support system 7.

The flange 16 comprises a frustoconical portion 27 extending, from the annular radial portion 21, radially inward and axially toward the radial bottom 9 of the casing 2, an annular radial portion 28 extending inward the frustoconical portion 27 and an annular axial portion 29 making it possible to house the rolling bearing 17. Stiffening ribs may be provided between the radial portion 28 and the axial portion 29 in the extension of the frustoconical portion 27.

More precisely, the radial portion 28 comprises a bore 29a delimited by two radial edges 30 and 31 directed inward. A plurality of axial fingers 32 are provided protruding from the radial portion 28 in the direction opposite to the radial bottom 9 of the casing 2. The flange 16 is advantageously made in a monobloc manner of a synthetic material molded in one piece, for example comprising polyamide 6-6 or else polyethylene terephthalate filled with glass or carbon fibers, for example in a proportion of the order of 10 to 50%, preferably of the order of 20 to 40%, for example approximately 30%.

The rolling bearing 17 comprises an inner race 33, an outer race 34, an array of rolling elements 35, in this instance balls, a cage 36 for maintaining the even circumferential spacing of the rolling elements 35 and a sealing flange 37. The rolling bearing 17 represents a structure similar to the rolling bearing 6 with two solid, deep-throated races forming a raceway in the bore of the outer race and over an outer bearing surface of the inner race. The flange 37 is mounted in a groove of the outer race 34 and forms a narrow passageway with an outer bearing surface of the inner race 33 while being placed on the side of the rotor 4. The outer race 34 is in contact with the bore 29a of the axial portion 29 and the radial edges 30 and 31 of the flange 16. Advantageously, the flange 16 is overmolded onto the outer race 34. This provides an excellent seal and mechanical strength between these two parts.

The encoder 19 comprises a support 38, in the shape of a metal sheet cup, and an active portion 39. The support 38 comprises an axial portion that is sleeve-fitted onto an external bearing surface of the inner race 33, on the side opposite to the sealing flange 37, a radial portion directed inward from the axial portion and in contact with a radial frontal surface of the inner race 33 and a frustoconical portion directed radially inward and axially opposite to the sealing flange 37 and extending the small-diameter end of the radial portion.

The active portion 39, for example a magnetized plasto-ferrite comprising a plurality of north and south poles alternating circumferentially, is overmolded onto the outer face of the frustoconical portion, a face of the radial portion opposite to the inner race 33 and a portion of the outer face of the axial portion. The active portion 39 has an axial outer surface and may comprise a number of poles that is not a multiple of the number of sensors.

The electronic module 18 comprises an electronic circuit board 40 of generally annular shape, in which a plurality of through-holes 41 is arranged, in this instance three in number, designed to interact with the fingers 32 of the flange 16. During assembly, the fingers 32 enter the holes 41 thereby maintaining the angle of the module 18 relative to the flange 16 and its indexation. The electronic circuit board 40, for example of the printed circuit type, supports a plurality of electronic components making it possible to process the output signals from the sensors 20 and to generate an output signal transmitted to other members not shown, by wire or else wirelessly. The electronic circuit board 40 also supports the sensors 20 by means of four groups of three holes 43 arranged close to its inner edge and in which lugs 44 of the sensor elements 20 are placed and then attached, usually be brazing. The sensors 20 may be placed circumferentially, evenly or unevenly distributed.

Figure 6:
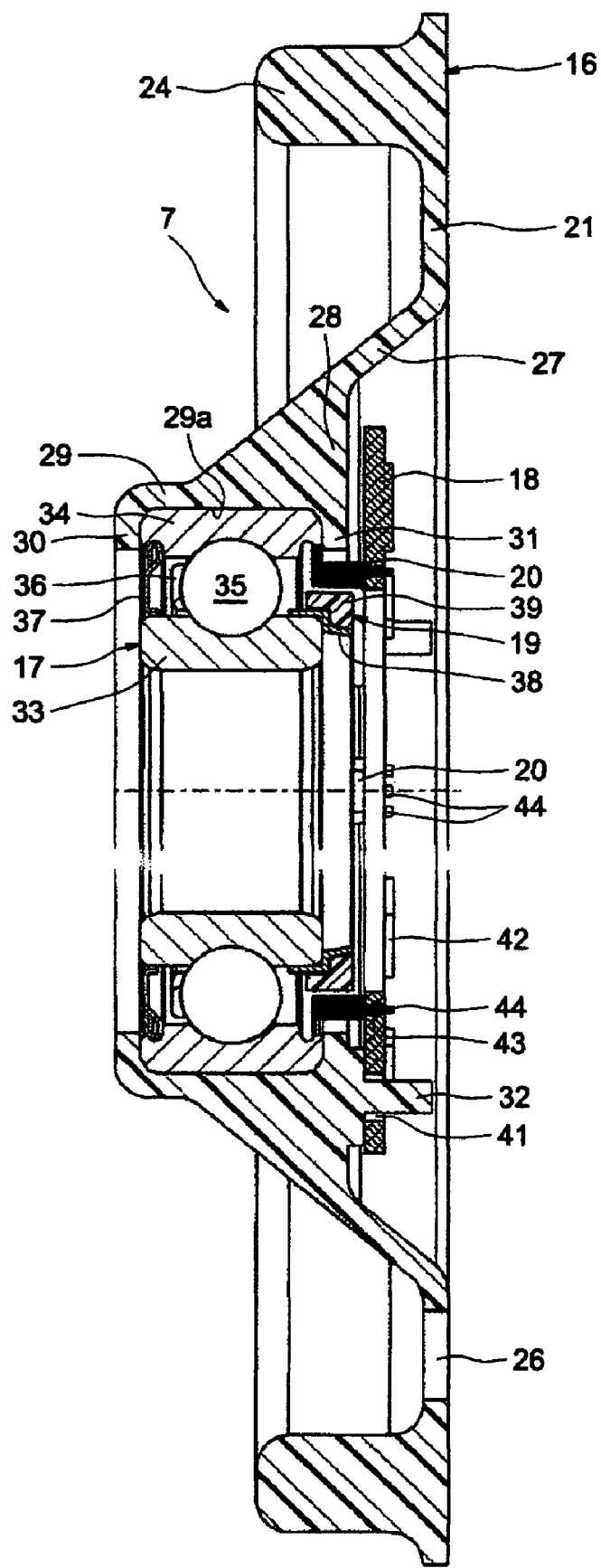
FIG. 6 is a view in axial section of the shaft support.

In the assembled state of the support system 7, illustrated in FIG. 6, the electronic module 18 is placed close to the outer face of the radial portion 28 of the flange 16. The sensor elements 20 protrude axially relative to the electronic circuit board 40 and are placed radially between the encoder 19 and the radial edge 31 of the radial portion 28 while being separate from the axial outer surface of the active portion 39 of the encoder 19 by a slight radial air gap. The electronic module 18 and the encoder 19 have an internal diameter that is greater than the bore of the inner race 33 in order to be able to allow one end of the shaft 5 of the electric motor to pass.

This gives a shaft support system forming a preassembled subassembly designed to be placed at the open axial end of the casing 2 and performing the functions of rotating shaft support 5 of the electric motor, closing off the open radial face of the casing 2, preventing rotation of the stator 3, detecting rotation parameters of the shaft 5, particularly the speed, the angular position, the acceleration, etc.

The shaft support system also makes it possible to support the signal processing electronics and the sensor(s). A cover may then protect the electronic module 18. The cover may be embedded in a sealed manner, thereby providing a high degree of protection for the inside of the electric motor and for the electronic circuit board. It is possible to arrange for the cover, of annular shape, attached to the flange 16, to form a narrow passageway with the encoder 19 and/or the inner race 33 of the rolling bearing 17. The cover may also be provided with a friction seal.

The manufacture of the shaft support system 7 may comprise the following steps. The flange 16 is overmolded onto the outer race 34 of the rolling bearing 17. In order to ensure a good coupling of the plastic material on the outer race 34 of the rolling bearing 17, it is possible to provide a knurling over at least a portion of the outer cylindrical surface of said outer race 34. The encoder 19 is sleeve-fitted onto the inner race 33. The electronic module 18 is mounted on the flange 16 and then the assembly is closed with the cover.

The assembly of the electric motor may be carried out with a small number of relatively simple operations. First of all, the rolling bearing 6 is placed in its housing at the bottom of the casing 2. The stator 3 is placed in the casing 2. The shaft 5 supporting the rotor 4 is placed in the bore of the inner race 11 of the rolling bearing 6. The shaft support subassembly 7 is placed and attached in the casing 2. The cover may then be attached to the flange. These steps are carried out by simple axial movements. The assembly of the motor is therefore considerably simplified.

Naturally, the processing module 18 and more particularly the electronic circuits 42 may be designed to transmit an item of output information in analog or digital form. The relative angular position of the poles of the encoder 19 and of the sensors 20 may make it possible to detect the absolute angular position and therefore to ascertain with a very high degree of precision the relative position of the poles of the rotor 4 relative to the poles of the stator 3. Alternatively, the electronic circuits 42 may be configured to transmit an item of output information in the form of pulse width modulation. The output signal may therefore be directly used by other external members.

The invention claimed is:

1. An electric motor, comprising:
 a shaft,
 a rotor,
 a stator,
 a casing that includes a first annular axial portion and a radial bottom being disposed on a first end of the electric motor, and
 a shaft support system disposed on a second end of the electric motor having;
 a rolling bearing provided including an inner race designed to be mounted on said shaft, and an outer race,
 at least one angular position sensor for detecting the angular position of the inner race,
 an encoder mounted on the inner race,
 a flange for supporting the outer race of the bearing, the flange having a frustoconical portion extending from a first annular radial portion, radially inward and axially toward the radial bottom of the casing, a second annular radial portion extending inward the frustoconical portion and a second annular axial portion making it possible to house the rolling bearing, and wherein,
 the second annular radial portion includes a bore delimited by two radial edges and directed inward, and
 a plurality of axial fingers being provided from the first annular radial portion in a direction opposite to the radial bottom of the casing, and
 a processing module supported by the flange, and wherein,
 the processing module is openly accessible to the second end of the shaft support system.

2. The system as claimed in claim 1, wherein the sensor is mounted on the processing module and the processing module is connected to an output of the sensor.

3. The system as claimed in claim 1, wherein the processing module is configured to receive an output signal from the at least one sensor representative of the angular position of the encoder relative to the sensor and to transmit as an output an item of processed information representative of the angular position of the encoder relative to the sensor.

4. The system as claimed in claim 1, wherein the flange includes means of attachment to an electric motor.

5. The system as claimed in claim 1, further comprising a means for sealing with an end of the inner race.

6. The system as claimed in claim 1, wherein the angular position sensor is capable of detecting an absolute angular position.

7. The system as claimed in claim 1, wherein the processing module includes an electronic circuit board supporting the sensor.

8. The system as claimed in claim 1, wherein the flange is overmolded onto the outer race of the rolling bearing.

9. The system as claimed in claim 1, wherein the outer race includes a surface in contact with the flange and furnished with coupling reliefs.

10. The system as claimed in claim 1, wherein the processing module is configured to transmit an item of output information in the form of pulse width modulation.

11. The motor as claimed in claim 1, wherein said shaft support system closes an axial end of the motor.

* * * * *